US007855003B2

(12) United States Patent
Arico et al.

(10) Patent No.: US 7,855,003 B2
(45) Date of Patent: Dec. 21, 2010

(54) CERAMIC AND ALLOY ANODE SOLID OXIDE FUEL CELL

(75) Inventors: Antonino Salvatore Arico, Contesse (IT); Laura Rosalba Gullo, Messina (IT); Daniela La Rosa, Lipari (IT); Stefania Siracusano, Messina (IT); Ana Berta Lopes Correira Tavares, Milan (IT); Agustin Sin Xicola, Carnate (IT)

(73) Assignee: Pirelli & C. S.p.A., Milan (IT)

( * ) Notice: Subject to any disclaimer, the term of this patent is extended or adjusted under 35 U.S.C. 154(b) by 1064 days.

(21) Appl. No.: 10/532,302

(22) PCT Filed: Oct. 21, 2003

(86) PCT No.: PCT/EP03/11639

§ 371 (c)(1),
(2), (4) Date: Oct. 11, 2005

(87) PCT Pub. No.: WO2004/038844

PCT Pub. Date: May 6, 2004

(65) Prior Publication Data

US 2006/0127747 A1    Jun. 15, 2006

(30) Foreign Application Priority Data

Oct. 25, 2002    (WO) .................. PCT/EP02/11963

(51) Int. Cl.
  *H01M 8/10*    (2006.01)
(52) U.S. Cl. .................... 429/30; 429/33; 429/40; 429/44
(58) Field of Classification Search .............. 429/44, 429/30, 33, 41, 42, 43, 13, 40; 502/101
See application file for complete search history.

(56) References Cited

U.S. PATENT DOCUMENTS

| 4,423,122 | A | * | 12/1983 | Iacovangelo et al. ......... 429/45 |
| 5,656,387 | A |   | 8/1997  | Barnett et al. |
| 2002/0061429 | A1 | * | 5/2002 | Batawi et al. .................. 429/30 |

FOREIGN PATENT DOCUMENTS

| EP | 0 588 536 A2 | 3/1994 |
| JP | 11-219710 | 8/1999 |
| WO | WO 97/35349 | 9/1997 |
| WO | WO 00/52780 | 9/2000 |

OTHER PUBLICATIONS

Müller, et al., "Influence of Current Density and Fuel Utilization on the Degradation of the Anode", Proc of the 3rd European Solid Oxide Fuel Cell Forum, Nantes France, pp. 353-362, (Jun. 1998).
Lu, et al., "Characterization of SDC Electrolyte-Supported SOFCs for Direct Oxidation of Hydrocarbon Fuels", Electrochemical Society Proceedings, vol. 2002-5, pp. 72-79, (2002).
Müller, et al., "Properties of NI/YSZ Cermets Depending on Their Microstructure", HTMC IUPAC, pp. 1-4, (Jul. 2000).
EG&G Technical Services, Inc. Science Applications International Corporation, Fuel Cell Handbook (Sixth Edition), 1 page, (Nov. 2002).
Gorte, et al., "Anodes for Direct Oxidation of Dry Hydrocarbons in a Solid-Oxide Fuel Cell", ADV. Materials, vol. 12, No. 19, pp. 1465-1469, (Oct. 2, 2000).
Livermore, et al., "Fuel Reforming and Electrical Performance Studies in Intermediate Temperature Ceria-Gadolinia-Based SOFCs", Journal of Power Sources, vol. 86, pp. 411-416, (Mar. 2000).
Park, et al., "Direct Oxidation of Hydrocarbons in a Solid Oxide Fuel Cell, I. Methane Oxidation", Journal of the Electrochemical Society, vol. 146, No. 10, pp. 3603-3605, (1999).
Murray, et al., "A Direct-Methane Fuel Cell with a Ceria-Based Anode", Nature, vol. 400, pp. 649-651, (Aug. 12, 1999).
Kim, et al., "Cu-Ni Cermet Anodes for Direct Oxidation of Methane in Solid-Oxide Fuel Cells", Journal of the Electromechanical Society, Electrochemical Society, vol. 149, No. 3, pp. A247-A250, (Jan. 29, 2002).
Herle, et al., "Oxalate Coprecipitation of Doped Ceria Powder for Tape Casting", Ceramics International 24, vol. 24, pp. 229-237, (1998).
Au, et al., "Mechanistic Studies of $CH_4/O_2$ Conversion over $SiO_2$-Supported Nickel and Copper Catalysts", Journal of Catalysts 158, pp. 343-348, (1996).
Park, et al., "Direct Oxidation of Hydrocarbons in a Solid-Oxide Fuel Cell", NATURE, vol. 44, pp. 265-267, (Mar. 2000).

* cited by examiner

*Primary Examiner*—Raymond Alejandro
(74) *Attorney, Agent, or Firm*—Finnegan, Henderson, Farabow, Garrett & Dunner, L.L.P.

(57) ABSTRACT

A solid oxide fuel cell is provided. The solid oxide fuel cell includes a cathode, at least an electrolyte membrane, and an anode having a ceramic material and an alloy of nickel and at least a second metal, selected from aluminum, titanium, molybdenum, cobalt, iron, chromium, copper, silicon, tungsten and niobium, the alloy having an average particle size not higher than 20 nm. The provided solid oxide fuel cells shows enduring efficiency when fuelled with different fuels, including hydrogen and hydrocarbons, in a wide range of operating temperatures.

17 Claims, 7 Drawing Sheets

CERAMIC AND ALLOY ANODE SOLID OXIDE FUEL CELL

CROSS REFERENCE TO RELATED APPLICATIONS

This application is a national phase application based on PCT/EP2003/011639, filed Oct. 21, 2003, which claims the priority of PCT/EP02/11963, filed Oct. 25, 2002, both of which are incorporated herein by reference.

BACKGROUND OF THE INVENTION

1. Field of the Invention

The present invention relates to a solid fuel cell, to a cermet material, to the process for the preparation of said cermet, and to a method for producing energy using such cell.

2. Description of the Related Art

Solid-oxide fuel cells (SOFCs) convert chemical energy into electrical energy with high efficiency and low emission of pollutants. Although the introduction of a "green energy" might seem an attractive scenario, its implementation is beset with technical and economic difficulties.

The most common anodes materials for solid oxide fuel cells comprise nickel (Ni) cermets (ceramic and metallic composite materials) prepared by high-temperature calcination of NiO and ceramic powders, usually yttria-stabilized zirconia (YSZ) powders. These Ni-cermets perform with $H_2$ fuels and allow internal steam reforming of hydrocarbons if there is sufficient water in the feed to the anode. Because Ni catalyzes the formation of graphite fibers in dry methane, it is necessary to operate anodes at steam/methane ratios greater than 3, as from WO 00/52780 (in the name of Gas Research Institute).

S. J. A. Livermore et al. *Journal of Power Sources*, vol. 86 (2000), 411-416, refers to a cermet anode for SOFC made of nickel and ceria-gadolinia (CGO). This anode performs at 600° C. using 10% $H_2/N_2$ as the fuel.

A. Müller et al., Proc. of the 3rd European Solid Fuel Cell Forum, Nantes France, June 1998, 353-362, relate to a Ni-YSZ anode fuel cell. It is envisaged a degradation of the anode related to microstructural changes occurring during operation. The nickel particles have a mean diameter of about 0.5 µm, and are homogeneously distributed in the anode. After long term operation at high current density and fuel utilization ($H_2+H_2O$), the agglomeration of the nickel particles leads to a decrease of the amount of three-phase boundary (TPB), resulting in an increase in the anode losses.

A. C. Müller et al., HTMC IUPAC Jülich 2000 suggest that the degradation described by the previous document could be prevented by a multilayer anode whose divers layers differ in their microstructure to fulfill the locally different requirements for SOFC anodes. In particular, the content of Ni and the Ni particle size should increase from first layer (that in contact with the electrolyte) to last layer, thus increasing electronic conductivity, TEC (Thermal Expansion Coefficient) and porosity. The YSZ content should simultaneously decrease. The cermet samples were prepared by mixing 65-85 mol % NiO powder with YSZ powder and sintering them in air at 1300° C. for 5 hours. The particle size of the metallic portion was 0.5-8 µm.

The use of nickel as the metallic component of a cermet anode is advantageous, but its performance drops in short time, especially when a dry hydrocarbon is the fuel, due to graphite formation.

R. J. Gorte et al., *Adv. Mater.*, 2000, vol. 12, No. 19, 1465-1469, propose to substitute nickel with copper (Cu) in a cermet wherein the ceramic portion is YSZ. Other components, including ceria ($CeO_2$), can be added to the metallic portion. In this configuration the role of $CeO_2$ is mainly to provide catalytic activity for the oxidation of hydrocarbons. As shown in FIG. 4a of this paper, the cell prepared with Cu but without ceria exhibits poor performance at 700° C., especially when methane is used as fuel.

C. Lu et al., High Temperature Materials, Proceedings volume 2002-5, Ed. S. C. Singhal, Pacific Northwest National Laboratory, Richland, Wash., USA, relate to a Cu-SDC (samaria-doped ceria) anode composite cell performing $H_2$ and butene fuels at 700° C.

From the above studies, it results that copper alone cannot be an efficient substitute for nickel as its performance is insufficient, in particular with fuels such as dry hydrocarbons.

H. Kim et al., *J. Electrochem. Soc.*, vol. 149 (3), A247-A250 (2002) examine the use of Cu—Ni alloys as anode component for the direct oxidation of methane in SOFC at about 800° C. The ceramic portion, which in this case is YSZ, is made by casting a tape with graphite pore formers over a green tape of YSZ without pore formers, firing the two-layered tape to about 1500° C. The porous anode layer was then impregnated with an aqueous solution of $Ce(NO_3)_3 \cdot H_2O$ and calcinated at about 500° C. to decompose the nitrate ions and form $CeO_2$. After the addition of ceria, the porous layer was impregnated with a mixed, aqueous solution of $Cu(NO_3)_2 \cdot H_2O$ and $Ni(NO_3)_2$—$H_2O$ having the desired Cu:Ni ratio. Finally the wafer was again heated to about 500° C. in air to decompose the nitrates and reduced in flowing $H_2$ at about 900° C.

The Applicant has faced the problem of providing a solid oxide fuel cell which is able to show high efficiency and to maintain its performance over time, particularly in terms of a low overpotential in a wide range of temperatures. Moreover, the fuel cell should be able to show the above characteristics when fed with different fuels. Endurance of performance is particularly important when a dry hydrocarbon is used as fuel, since it tends to form graphite fibers on the metallic portion of the cermet anode, which eventually annihilate the fuel cell activity.

SUMMARY OF THE INVENTION

The Applicant has now found that by using a nickel alloy with one or more metals as metallic portion of a cermet anode, and by reducing the average size of the particles constituting said alloy, the resulting SOFC shows enduring efficiency when fuelled with different fuels, including hydrogen and hydrocarbons, in a wide range of operating temperatures, and particularly at low temperatures, namely from 500° C. to 700° C. Particularly, when a dry hydrocarbon is used as fuel, deposition of graphite fibers is remarkably reduced. This result is particularly surprising since a reduction of the average particle size in the metallic component of the cermet would have been expected to increase the catalytic activity also with respect to those side reactions which cause formation of the graphite fibers.

The present invention thus relates to a solid oxide fuel cell including a cathode;

at least an electrolyte membrane, and an anode comprising a ceramic material and an alloy comprising nickel and at least a second metal selected from aluminium, titanium, molybdenum, cobalt, iron, chromium, copper, silicon, tungsten, niobium, said alloy having an average particle size not higher than 20 nm.

Preferably the anode of the invention comprises an alloy wherein said alloy has an average particle size not higher than 16 nm. More preferably said average particle size is not lower than 1 nm.

The alloy of the anode of the invention can show a mean surface area higher than 20 m$^2$/g, preferably higher than 30 m$^2$/g, and more preferably higher than 40 m$^2$/g.

Preferably in the anode of the invention the alloy has a second metal content of from about 1% by weight to about 99% by weight, more preferably, and even more preferably from about 40% by weight to about 60% by weight.

Preferably in the anode of the present invention the alloy has a nickel content of from about 1% by weight to about 99% by weight, more preferably from about 30% by weight to about 70% by weight, and even more preferably of about 50% by weight.

Preferably, said second metal is copper.

Said alloy can comprise an additional metal, for example, an element belonging to one of the classes from 3 to 13 of the periodic table of elements according to Chemical and Engineering News, 63(5), 27, 1985, lanthanides series included.

The ceramic material of the anode of the invention can be selected from yttria-stabilized zirconia (YSZ), cerium gadolinium oxide (CGO), samarium-doped ceria (SDC), mixed lanthanum and gallium oxides. Preferably the ceramic material is cerium gadolinium oxide (CGO).

The ceramic material of the anode of the present invention can show a particle size not higher than 50 nm, preferably from about 1 to about 25 nm.

Optionally, said ceramic material is doped with at least one cation selected from calcium, magnesium, strontium, lanthanum, yttrium, ytterbium, neodymium and dysprosium.

Optionally, the alloy of the invention comprises cerium oxide ($CeO_2$), optionally added with additives like cobalt.

The solid oxide fuel cell according to the present invention can be operated in a wide range of temperatures, usually ranging from 450° C. to 800° C., and preferably from 500° C. to 700° C.

In another aspect the present invention relates to a cermet comprising an alloy having a particle size not higher than 20 nm.

Both the metallic and the ceramic portion of the cermet anode of the present invention can be prepared from the corresponding metal salts, which may be compounded in a solid solution of the oxides thereof.

In a further aspect the present invention relates to a process for preparing a cermet including a ceramic material and a metallic material comprising an alloy comprising nickel and at least a second metal selected from aluminium, titanium, molybdenum, cobalt, iron, chromium, copper, silicon, tungsten, niobium, said process comprising the steps of:

a) producing a precursor of the metallic material;
b) producing the ceramic material;
c) combining said precursor and ceramic material to obtain a composite;
d) reducing said composite wherein step a) comprises the phases of a-1) dissolving a hydrosoluble salt of Ni and a hydrosoluble salt of a second metal in water;
a-2) adding a chelating agent to the solution resulting from step a-1);
a-3) adding an oxidizing agent to the solution resulting from step a-2);
a-4) isolating said precursor.

Optionally, the pH of the solution resulting from phase a-2) is adjusted at a value higher than about 5.

Preferably, phase d) is carried out by hydrogen at a temperature ranging between about 400° C. and about 1000° C., more preferably between about 500° C. and about 800° C.

Step b) can include phases analogous to those from a-1) to a-4) of the process above, starting from the hydrosoluble salts corresponding to the oxide of the desired ceramic material. Phase a-4) can be followed by a crystallization step, for example at a temperature ranging between about 200° C. and about 700° C., more preferably between about 300° C. and about 500° C.

Preferably, the oxides of the present invention are prepared starting from hydrosoluble salts of the desired metals which are dissolved in water and added with a chelating agent, for example, EDTA, oxalic, citric, acetic acid and the organic salts thereof, while maintaining the reaction mixture at a suitable pH, for example, higher than about 5.

Oxidation is then carried out, e.g. by addition of a peroxide, such as hydrogen peroxide, and co-precipitate of amorphous metal oxides is obtained.

This co-precipitate comprises very fine amorphous particles substantially free from any crystallographic ordering as revealed by XRD (X-ray diffraction) and TEM (transmission electron microscopy) analyses, as shown in the examples. The morphological and structural features obtained through this preferred method allow a superior extension of the three-phase boundary (TPB) zone, advantageous to the performance of the SOFC.

After thermal treatment of the precursor, in air or inert atmosphere, for example helium, a solid solution of the metallic oxides intimately admixed on an atomic scale, with fine particles size, is obtained. The particle size can range from about 3 to about 20 nm, preferably from about 4 to about 7 nm, more preferably of about 5 nm.

In the case the ceramic portion of the cermet anode according to the invention is prepared through the above mentioned process, crystallization of the amorphous oxide precursor, for example at a temperature ranging between about 200° C. and about 700° C., more preferably between about 300° C. and about 500° C., can yield a ceramic with small particle size, for example ranging between about 6 and about 2 nm.

The preparation of the cermet anode, i.e. the material system comprising a metallic and a ceramic phase, can be carried out as follows. Amorphous mixed oxide precursor, obtained as said above, and a ceramic powder, preferably CGO or SDC, are admixed, and a slurry is prepared by dispersing the reactants in an organic solvent, for example isopropanol, and further treated with ultrasounds. The mixture is heated for solvent evaporation, and a reduction, for example in $H_2$ atmosphere, is carried out while heating, for example at a temperature ranging between about 400° C. and about 1000° C., more preferably between about 500° C. and about 800° C.

A solid oxide fuel cell of the invention can be prepared by applying said slurry of composite on an electrolyte membrane comprising a ceramic material, for example, CGO, SDC or YSZ.

A cathode for the solid oxide fuel cell of the invention can comprise a perovskite such as $La_{1-x}Sr_xMnO_{3-\delta}$, for example can be a $La_{0.6}Sr_{0.4}MnO_3$/CGO.

The solid oxide fuel cell according to the invention displays great flexibility in the choose of the fuel to be fed with. It can performs by feeding the anode with a fuel selected from hydrogen; an alcohol such as methanol, ethanol, propanol; a hydrocarbon in gaseous form such as methane, ethane, butene; carbon dioxide, carbon monoxide, natural gas, reformed natural gas, biogas, syngas and mixture thereof, either in the presence of water or substantially dry; or an hydrocarbon in liquid form, e.g. diesel, toluene, kerosene, jet fuels (JP-4, JP-5, JP-8, etc). Preferred by the present invention is substantially dry methane.

When a substantially dry fuel is fed to the anode, a direct oxidation is effected in the solid oxide fuel cell of the invention. In the case of dry methane, the reaction at the anode is the following $$CH_4 + 4O^{2-} \rightarrow CO_2 + 2H_2O + 8e^-$$

As already said above, the direct oxidation of a dry fuel such as a dry hydrocarbon yields coking phenomena (deposition of graphite fibers) at the metallic portion of the cermet thus exhausting the catalytic activity. The solid oxide fuel cell of the invention can perform by direct oxidation of a dry fuel.

In another further aspect, the present invention relates to a method for producing energy comprising the steps of:
  feeding at least one fuel into an anode side of a solid oxide fuel cell comprising an anode including a ceramic material and an alloy comprising nickel and at least a second metal selected from aluminium, titanium, molybdenum, cobalt, iron, chromium, copper, silicon, tungsten, niobium, a cathode and at least an electrolyte membrane disposed between said anode and said cathode;
  feeding an oxidant into a cathode side of said solid oxide fuel cell; and
  oxidizing said at least one fuel in said solid oxide fuel cell, resulting in production of energy.

The operating temperature of the solid oxide fuel cell of the invention can range from 450° C. to 900° C., preferably from 500° C. and 800° C.

An advantage provided by low operating temperatures, such those preferred by the present invention, is the reduction of $No_x$ formation at the cathode. The formation of such undesired by-products is due to the reaction of the nitrogen present in the air fed at the cathode side, such reaction being related to temperature increase.

In case of operating with reformed fuel, the fuel is internally reformed at the anode side.

BRIEF DESCRIPTION OF THE DRAWINGS

The invention will be further illustrated hereinafter with reference to the following examples and figures, wherein FIGS. 1a and 1b schematically illustrate fuel cell power systems.

DETAILED DESCRIPTION OF THE INVENTION

Figure 1A:
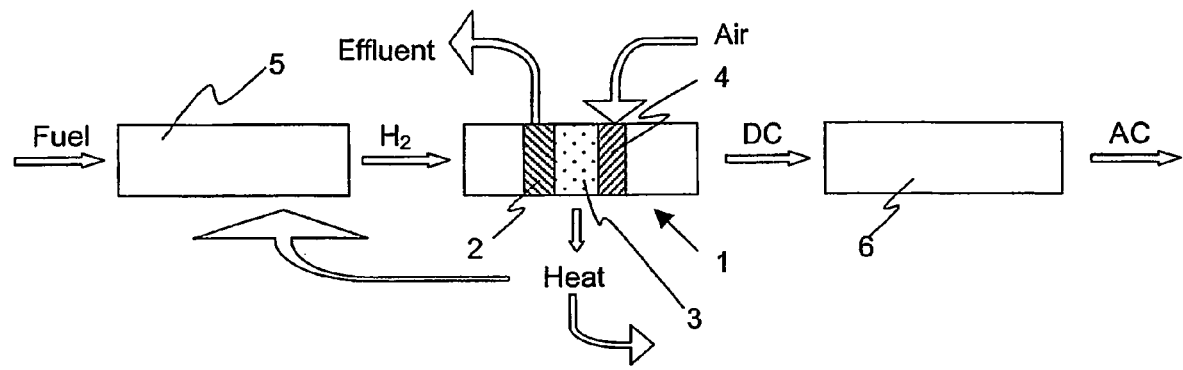
Figure 1B:
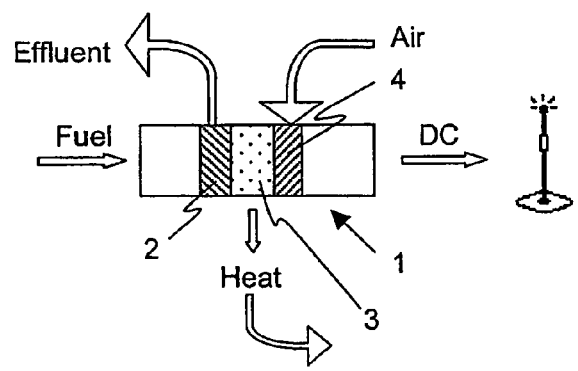

FIGS. 1a and 1b schematically illustrate a solid oxide fuel cell power systems. The solid oxide fuel cell (1) comprises an anode (2), a cathode (4) and an electrolyte membrane (3) disposed between them.

In FIG. 1a fuel generally a hydrocarbon, is fed to be converted into hydrogen as described, e.g., in "Fuel Cell Handbook", sixth edition, U.S. Dept. of Energy, 2002. Hydrogen is fed to the anode side of the solid oxide fuel cell (1). Cathode (4) is fed with air.

The fuel cell (1) produces energy in form of heat and electric power. The heat can be used in a bottoming cycle or conveyed to fuel reformer (5). The electric power is produced as direct current (DC) and may be exploited as such or converted into alternate current (AC) via a power conditioner (6).

FIG. 1b shows a preferred embodiment of the invention. A substantially dry fuel is fed to the anode (2) where direct oxidation is effected. The heat can be used in a bottoming cycle. The direct current produced is exploited as such, for example in telecommunication systems.

In both the cases of FIGS. 1a and 1b, from anode (2) an effluent flows which can be composed by unreacted fuel and/or reaction product/s, for example water and/or carbon dioxide in the case of FIG. 1b.

Example 1

Oxide Precursor and Alloy Preparation a) NiCu alloys were prepared from reagent graded $Ni(NO_3)_2 \cdot 6H_2O$ and $Cu(NO_3)_2 \cdot 6H_2O$ (Aldrich 99.99). Stoichiometric amounts of the metal nitrates (2.86 g of $Cu(NO_3)_2 \cdot 6H_2O$, 3.1 g of $Ni(NO_3)_2 \cdot 6H_2O$) were dissolved in distilled water (50 ml) and then complexed at 60° C. with an aqueous solution of oxalic acid (9.5 g in 200 ml; Aldrich 99.99) at pH=6.5 adjusted with NaOH 0.1N. The molar ratio between complexing agent and the sum of the metal ions was 10. The complex formation was monitored by UV spectroscopy. The solution was heated to 80° C., and oxygen peroxide (400 ml, 20%, Carlo Erba) was then dropwise added until complete formation of a precipitate. The precipitate was filtrated, washed with distilled water, and dried at 120° C. K for 12 hours.

b) The powder obtained at step a) was then calcinated at 500° C. in air for 0.5 hour, to yield a crystalline phase.

c) The crystalline phase of step b) was heated at 500° C. under $H_2$ atmosphere ($H_2$ for 30 min, 50 cc $min^{-1}$ $g^{-1}$ catalyst), in order to reduce the oxide phase to a metallic phase.

In order to verify the phase composition and structure at steps a), b) and c), the powders were analyzed by X-ray fluorescence (XRF) and X-ray diffraction (XRD) analyses.

XRF analysis (for composition) was carried out by Explorer Spectrome-ter (Bruker AXS, Germany) equipped with a Rh X-ray source. The instrument was equipped with 0.12° divergence collimator, LiF220 crystal analyzer and scintillation as well as proportional detectors.

Figure 2:
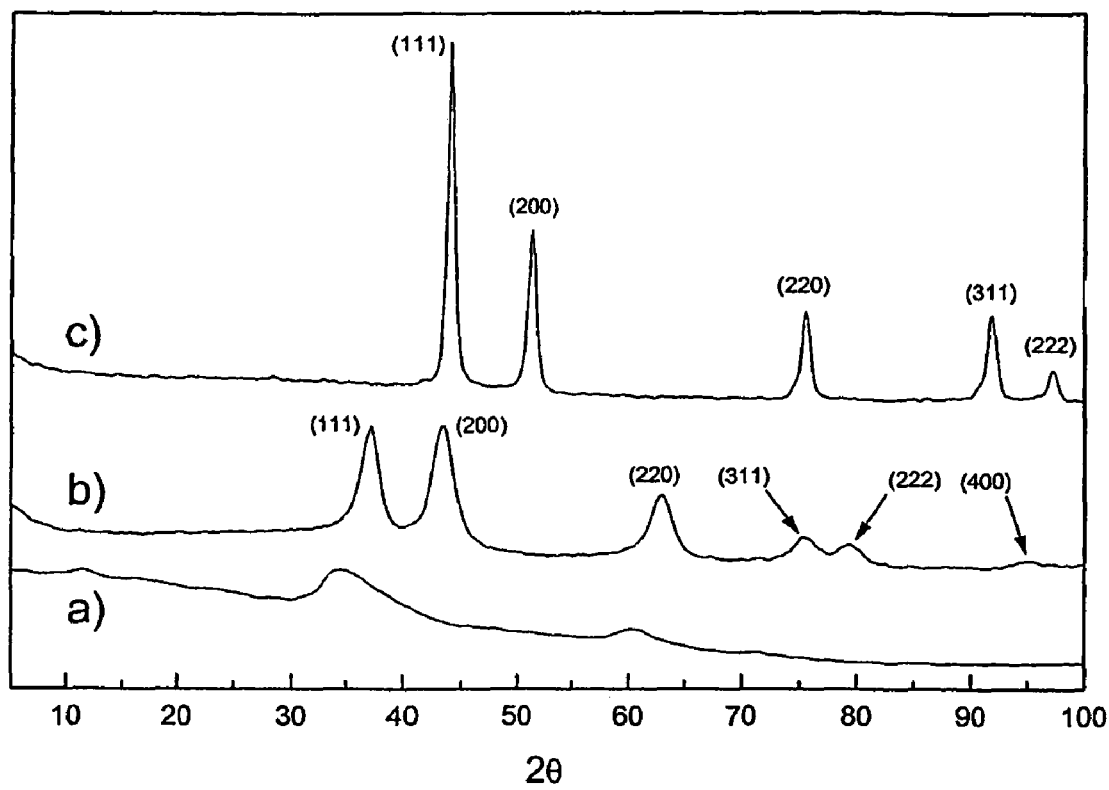
FIG. 2 illustrates XRD patterns of (a) amorphous oxide precursor $Ni_{0.58}Cu_{0.42}O$, (b) crystalline oxide precursor $Ni_{0.58}Cu_{0.42}O$ and (c) $Ni_{0.58}Cu_{0.42}$ bulk alloy.

XRD analysis (for structure and particle size determination) was carried out under Bragg-Brentano configuration with CuKalpha radiation with Xpert Diffractometer (Philips). The instrument was equipped with graphite mono-chromator. The analysis range was selected from 5° to 100° 2θ, the sweep rate was 1.5° min$^{-1}$. Results are shown in FIG. 2.

For each step product, the average particle size was calculated from XRD line broadening measurements using Scherrer equation. The results are set forth in Table 1, wherein the metal surface area was calculated from the particle size by the following formula:

$$MSA(m^2\,g^{-1}) = 6 \cdot 10^4/(\rho \cdot d);$$

wherein $\rho = (g\,cm^{-3})$ is density and d (Å) particle size.

The formation of the metal solid solution was checked by XRD, monitoring the shifts on the diffraction peak assigned to the various reflections in particular the Ni (200) (JCPDS-ICCD data file, card no 4-8509) and Cu (200) (JCPDS-ICCD data file, card no 4-836) planes, and calculating the variation in the lattice parameter of the metallic alloy structure from Vegard law.

TABLE 1

Lattice parameter (a), particle size (d) and surface area (SA) of NiCuO$_x$ and NiCu phases

| Phase/preparation step (ex. 1) | (Ni:Cu) | Lattice parameter a$_{fcc}$/Å | Particle size d/nm | Surface area SA/m$^2$ g$^{-1}$ |
|---|---|---|---|---|
| NiCuO$_x$ amorphous (step a) | 90:10 | — | <1.5 | — |
|  | 65:35 | — | <1.5 | — |
|  | 58:42 | — | <1.5 | — |
| NiCuO$_x$ crystalline (step b) | 90:10 | 4.162 | 6.7 | 100.6 |
|  | 65:35 | 4.178 | 4.1 | 164.4 |
|  | 58:42 | 4.183 | 4.3 | 156.8 |
| NiCu alloy (step c) | 90:10 | 3.521 | 15.9 | 42.4 |
|  | 65:35 | 3.549 | 13.4 | 50.3 |
|  | 58:42 | 3.552 | 19.2 | 36.0 |

XRD analysis of the powder obtained from step a) did not show any important crystallographic reflection but only an amorphous scattering, as from FIG. 2,a).

XRD analysis of the powder obtained from step b) showed the characteristic peaks of the faced centered cubic (fcc) structure of NiO shifted linearly as a function of the composition of the solid solution, as from FIG. 2,b). No evidence of monocline CuO phase was observed indicating that Cu atoms occupy the same crystallographic positions of Ni in the fcc structure with a random distribution. No evidence of superlattice lines was detected.

XRD analysis of the powder obtained from step c) showed for the various compositions only the typical diffraction peaks of the fcc structure, as from FIG. 2,c). The lattice parameter varied linearly between pure Ni and Cu metals as a function of relative composition.

Summarizing, at step a) an amorphous oxide with very small particle size (<1.5 nm) is formed (see FIG. 2.a), at step b) a crystalline oxide solid solution is formed with a particle size around 5 nm (see FIG. 2.b), and at step c) (see FIG. 2.c) a single metallic phase is obtained (particle size 10-20 nm).

Example 2

Temperature Programmed Reduction (TPR) on NiO, CuO and NiCuO$_x$ Oxides

TPR experiments were carried out in a tubular quartz microreactor. A temperature sweep rate of 10° C. min$^{-1}$ was selected, the catalyst weight was 5 mg and a TCD detector was used to determine H$_2$ consumption. A stream of 5% H$_2$ in Ar at a flow rate of 30 ml/min was fed to the reactor.

Three different samples, CuO (Aldrich), NiO (Aldrich) and Ni$_{0.58}$Cu$_{0.42}$O$_x$ were subjected to TPR experiments with H$_2$, in order to compare their reduction kinetics and confirm the effectiveness of the process of the invention in preparing a metallic alloy.

Figure 3:
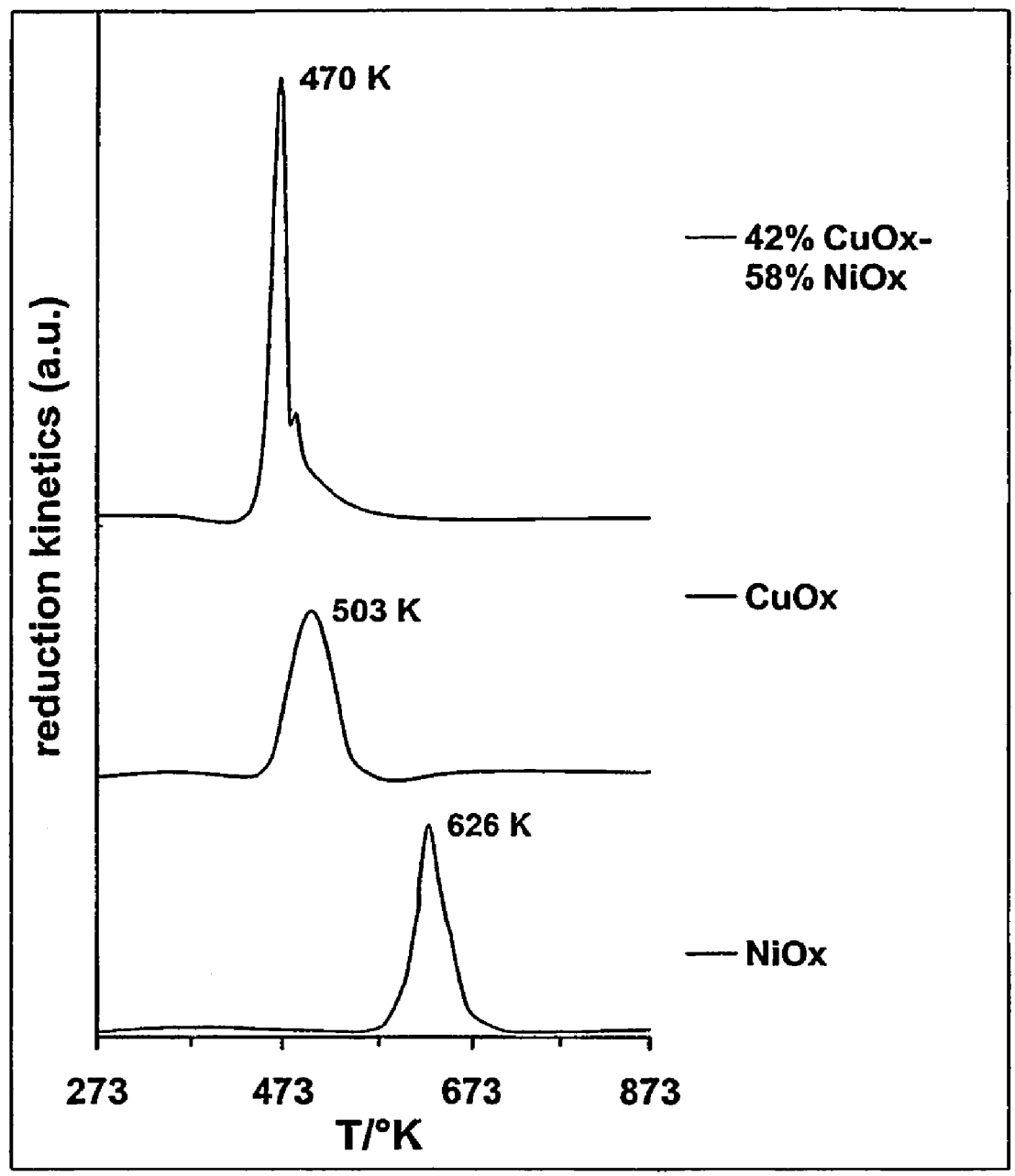
FIG. 3 shows temperature reduction profiles with $H_2$ for (a) CuO, (b) NiO and (c) $Ni_{0.58}Cu_{0.42}O$ crystalline precursor.

The recorded profiles of FIG. 3 show that the onset for hydrogen consumption and the respective peak maximum did occur on the mixed phases at a much lower temperatures with respect to the single phases: 470 K (about 197° C.) for Ni$_{0.58}$Cu$_{0.42}$O$_x$, 503 K (about 230° C.) for CuO and 626 K (about 353° C.) for NiO, respectively. Further, the reduction peak for the mixed Ni$_{0.58}$Cu$_{0.42}$O$_x$ phases is much more narrow, pointing for a faster reduction kinetics, thus a higher affinity for hydrogen, effective for reforming.

Example 3

Catalytic Activity for Methane Oxidation

Reforming

Methane reforming experiments were carried out in a packed bed tubular reactor (in-house made), where 15 mg of alloy catalyst of example 1,c) were diluted in 50 mg of quartz powder (Carlo Erba). Reactant feed was H$_2$O/CH$_4$ (molar ratio 4:1), with a space velocity of $10^5$ h$^{-1}$.

Methane steam reforming experiments were carried out on a Ni$_{0.58}$Cu$_{0.42}$ bulk alloy example 1,c) and on a Ni,Cu metallic mixture of same compositions prepared by grinding and ultrasonically mixing NiO and CuO oxides (Aldrich) followed by reduction under same conditions of Example 1,c).

Figure 4:
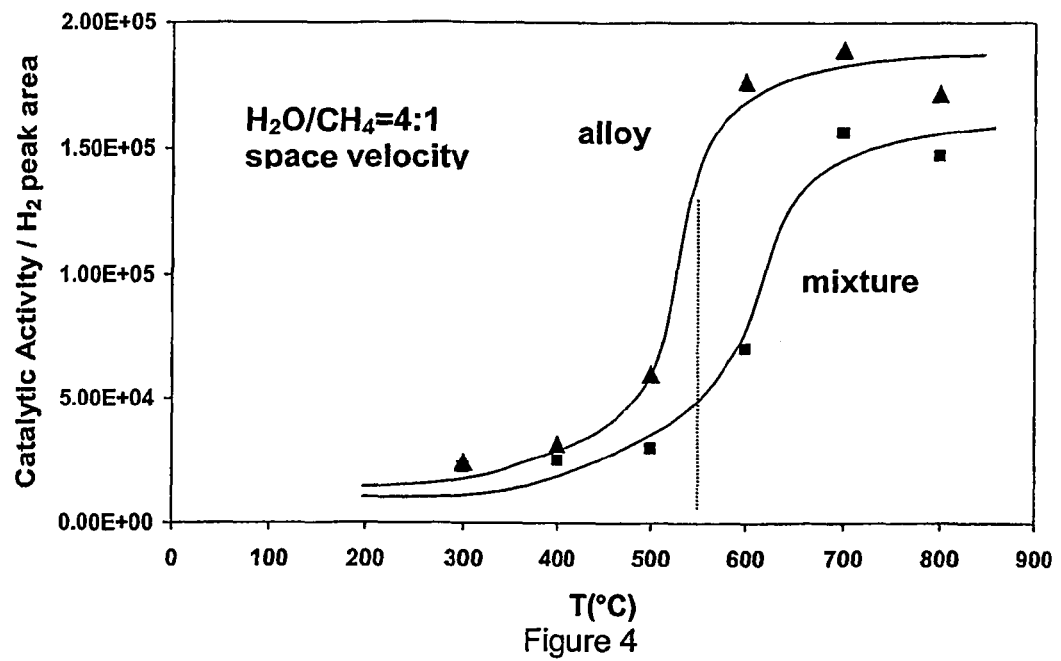
FIG. 4 illustrates catalytic activity vs temperature profile for methane steam reforming experiments carried out for $Ni_{0.58}Cu_{0.42}$ bulk alloy and Ni,Cu metallic mixture.

FIG. 4 shows that the onset temperature for the reaction on the Ni$_{0.58}$Cu$_{0.42}$ alloy is significantly lower than for that on the Ni,Cu metallic mixture. The inflection point in the curve of catalytic activity vs. temperature for Ni$_{0.58}$Cu$_{0.42}$ alloy is about 50 K (200° C.) lower than that of Ni,Cu metallic mixture and 100 K lower than that reported in the literature for supported Ni catalysts (see C. T Au, H. Y. Wang, H. C. Wan, J. Catalysis 158 (1996) 343).

Elemental analysis was used to determine the carbon content in the catalyst after catalytic and electrochemical experiments. Analyses were carried out with a Carlo Erba CHNSO elemental analyser. No evidence of carbon deposition was found after reforming experiments on the Ni$_{0.58}$Cu$_{0.42}$ alloy.

Example 4

Ni$_{0.58}$Cu$_{0.42}$-CGO (50:50 w/w) Cermet Preparation

Ce$_{0.9}$GdO$_{1.95}$ (CGO) (prepared by co-precipitation of the cerium and gadolinium nitrates with oxalic acid at pH=6, followed by thermal decomposition at 973K, as from Herle J. V., Horita T., Kawada T., Satoi N., Yokokawa H., Dokya M., Ceramic International, vol. 24, 229, 1998), and amorphous $Ni_{0.58}Cu_{0.42}O$ (obtained in Example 1,a) were intimately mixed in an agate mortar. Slurry was prepared by adding 10 ml of isopropyl alcohol to the powder mixture (116 mg CGO and 147 mg of amorphous $Ni_{0.58}Cu_{0.42}O$), which was further ultrasonicated in order to reduce the formation of agglomerates. The composite was then heated to 423 K (about 150° C.) for solvent evaporation, followed by reduction at 773 K (about 500° C.) for 0.5 h under hydrogen flux. The formation of the NiCu alloy on CGO was confirmed by X-ray diffraction (see FIG. 5 wherein * is for $Ni_{0.58}Cu_{0.42}$, and ° is for CGO).

Example 5

Preparation of a $Ni_{0.5}Cu_{0.5}$-CGO (50:50 w/w) Cermet

Reference Preparation 1 g of CGO powder was impregnated according to what taught by H. Kim, et al., supra, with a 50 ml aqueous solution of $Cu(NO_3)_2.H_2O$ (280 mg) and $Ni(NO_3)_2.H_2O$ (310 mg). Finally the layer was again heated to 500° C. and reduced in flowing $H_2$ at 900° C.

Figure 5:
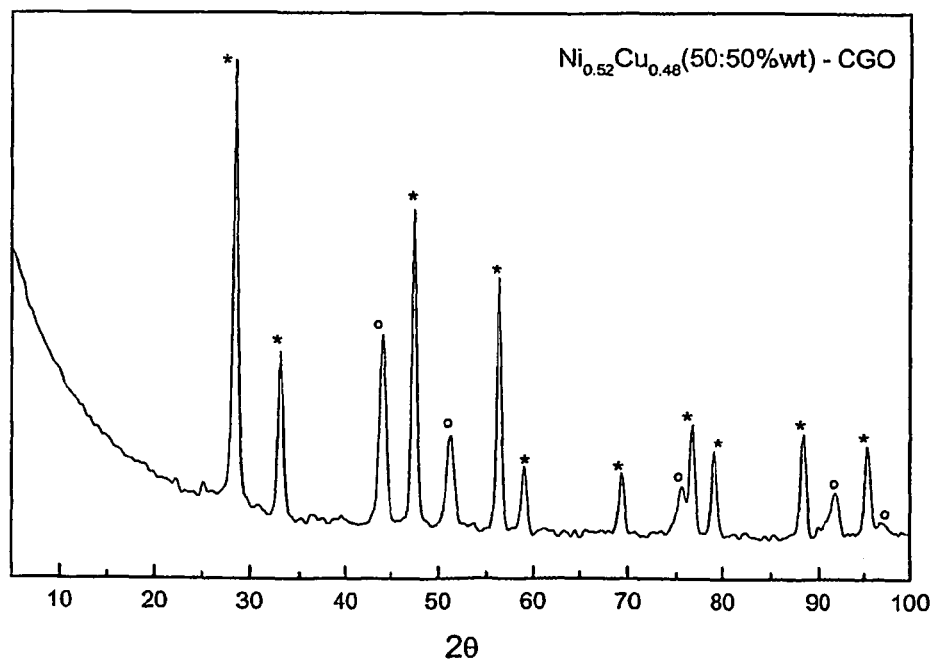
FIG. 5 shows XRD pattern of a $Ni_{0.58}Cu_{0.42}$ (*)-CGO (o) cermet.
Figure 6:
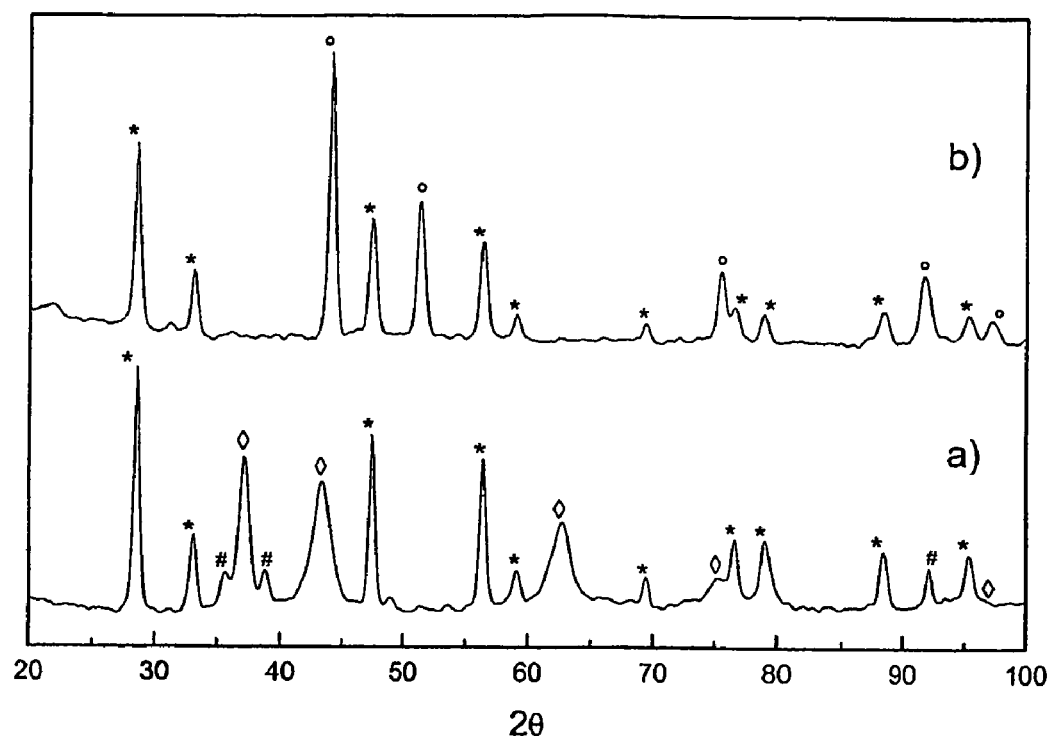
FIG. 6 shows XRD patterns of (a) crystalline $Ni_{0.5}Cu_{0.50}$-CGO composite after thermal treatment at 500° C. and (b) $Ni_{0.5}Cu_{0.5}$ (*)-CGO (o) cermet after reduction at 900° C.; (#) corresponds to CuO phase.

XRD analysis showed (FIG. 6) that the NiCu/CGO cermet prepared according to said method show particle size higher and surface area lower than that obtained in Example 4 (as from comparison with FIG. 5). Table 2 sets forth the comparison by numbers.

TABLE 2

Particle size (d) and surface area (MSA) of
NiCu alloys in NiCu-CGO cermets

| Preparation process | d/nm | Surface area (m²/g) |
|---|---|---|
| Example 4 | 15 | 43 |
| Example 5 | 26 | 26 |

Example 6

Cell Preparation

A cell was fabricated having a CGO electrolyte, a LSM/CGO layer as a cathode and a NiCu-CGO layer of Example 4 as an anode.

The CGO electrolyte (~500 μm, >90% theoretical density) was prepared by uniaxial pressing at 300 MPa of a $Ce_{0.9}Gd_{0.1}O_{1.95}$ powder obtained as in Example 4. Before use for pellet preparation, the powder was thermally treated at 1050° C. for 1 h. The pellet was thermally treated at 1550° C. for 3 hrs.

As the cathode, a 30 μm LSM/CGO layer (50:50% wt) was deposited by a painting process on one side of the pellet and fired at 1250° C. for 1 hour in air to assure good bonding to the electrolyte. The slurry used was composed of 100 mg CGO synthesized powder and 100 mg LSM ($La_{0.6}Sr_{0.4}MnO_3$, Praxair) both intimately mixed and dispersed in 1.5 ml of isopropanol.

A 20 μm anodic cermet layer of amorphous $Ni_{0.58}Cu_{0.42}O$-crystalline CGO (50:50% wt) slurry was deposited by painting in one step on the CGO dense layer side of the CGO-LSM/CGO substrate. The slurry was prepared by dispersing 100 mg of amorphous $Ni_{0.58}Cu_{0.42}O_x$ and 100 mg of synthesized CGO powders in 1.5 ml of isopropylalchool (carlo Erba). The total amount of deposited metal phase was 2.5 mg/cm². This was dried at 423 K (about 150° C.) to remove the solvent.

A 5 μm Au (Hereus) film, to be used as the anodic current collector in the electrochemical cell, was then deposited by painting on the anodic layer, and the whole assembly was heated at 150° C. for solvent evaporation. Two Au wires on each side were allocated for sampling current and potential.

Also, a 5 μm thin Pt (Enghelard) film, to be used as the cathodic current collector in the electrochemical cell, was then deposited by painting on the cathodic layer. A Pt reference electrode was allocated on the cathodic side to allow operation of the device under half-cell configuration.

The cell (0.5 cm² active area) was mounted on an alumina tube and sealed with quartz adhesive.

Finally the system was heated at 500° C. for 1 h in air to allow formation of a crystalline $Ni_{0.58}Cu_{0.42}O_x$ oxide. Inert gas (He) was passed through the anode before hydrogen supply. An hydrogen stream flow rate (50 cc $min_{-1}$) was fed to the anode at 500° C. to assure the alloy formation.

Example 7

Characterization in Half-Cell Configuration

Hydrogen Fuelled Anode)

Electrochemical evaluation of the performance of a solid oxide fuel cell according to Example 6, fed with hydrogen was carried out.

The hydrogen flow rate was 50 cc $min^{-1}$, and static air was used as oxidant. No humidification was used for the anode stream.

The cell was conditioned for at least 1 h in hydrogen at 800° C. before recording the polarization curves and ac-impedance spectra.

Electrochemical experiments were carried out both under galvanostatic and potentiostatic controls by using an AUTO-LAB Ecochemie potentiostat/galvanostat and impedance analyser. The polarization data were collected under steady state conditions. Ac-impedance spectra were collected in the range 1 MHz-1 mHz with a 20 mV rms sinusoidal signal under open circuit conditions. A four-electrode configuration was used in all cases. In half-cell experiments, one potential probe was connected to a non-polarized reference electrode and the overpotential of the working electrode was measured against this reference.

Figure 7:
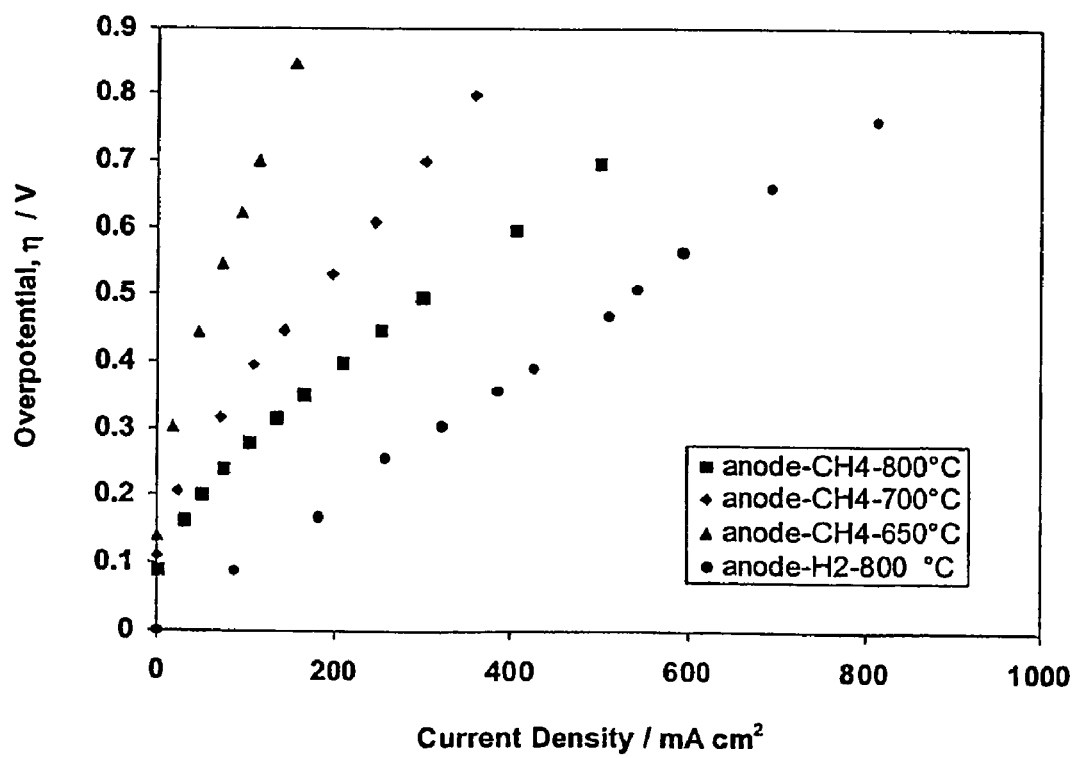
FIG. 7 shows electrochemical polarisation curves for $Ni_{0.58}Cu_{0.42}$-CGO cermet anode/CGO electrolyte interface in dry $H_2$ and dry $CH_4$ in the temperature range between 650° and 800° C.

Raw half-cell data of the $Ni_{0.58}Cu_{0.42}O$/CGO cermet anode/CGO electrolyte interface indicated that this anode is active for the electrochemical oxidation of dry $H_2$, as depicted in FIG. 7.

Figure 8:
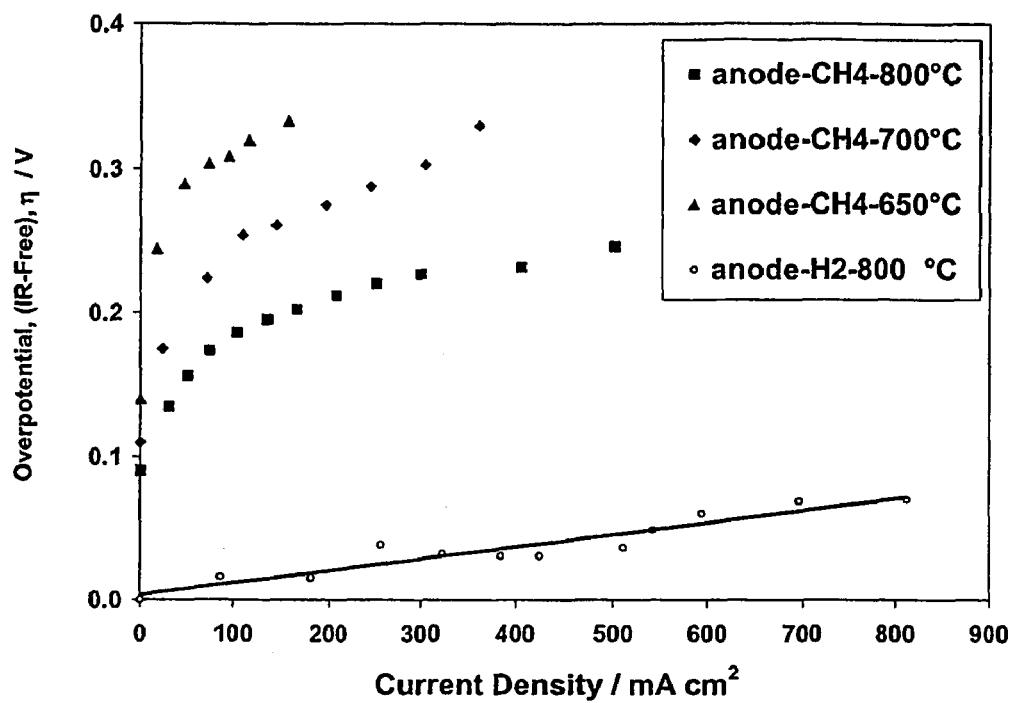
FIG. 8 illustrates IR free electrochemical polarisation curves for $Ni_{0.58}Cu_{0.42}$-CGO cermet anode/CGO electrolyte interface in dry $H_2$ and dry $CH_4$ in the temperature range between 650° and 800° C.

IR-free data (FIG. 8) show very low overpotentials, less than 50 mV for j=500 mA $cm^{-2}$. The curves recorded in presence of hydrogen show no activation (kinetic) control. These data indicate that the $Ni_{0.58}Cu_{0.42}$/CGO cermet anode combined with thin CGO electrolyte achieves high performances for the oxidation of dry hydrogen.

Example 8

Characterization in Half-Cell Configuration

Dry Methane Fuelled Anode)

Electrochemical evaluation of the performance of a solid oxide fuel cell according to Example 6, fed with hydrogen was carried out.

Methane flow rate was 50 cc $min^{-1}$, and static air was used as oxidant. No humidification was used for the anode stream.

The cell was conditioned for at least 1 h in methane at 800° C. before recording the polarization curves and ac-impedance spectra.

Electrochemical experiments were carried out as in Example 8, but testing the cell at three different temperatures, i.e. 800° C., 700° C. and 600° C., sequentially.

Raw half-cell data of the $Ni_{0.58}Cu_{0.42}O$/CGO cermet anode/CGO electrolyte interface indicated that this anode is active for the electrochemical oxidation of dry methane, as depicted in FIG. 7.

IR-free data (8) show for j=500 mA cm$^{-2}$ overpotentials of 250 and 350 mV vs. the reversible potential for $H_2$ oxidation at 800° C. and 700° C. respectively. The curves recorded in presence of methane show a slight activation (kinetic) control that is not observed in presence of hydrogen. These data indicate that the $Ni_{0.58}Cu_{0.42}$/CGO cermet anode combined with thin CGO electrolyte achieve high performances for the oxidation of dry methane.

Example 9

Figure 9:
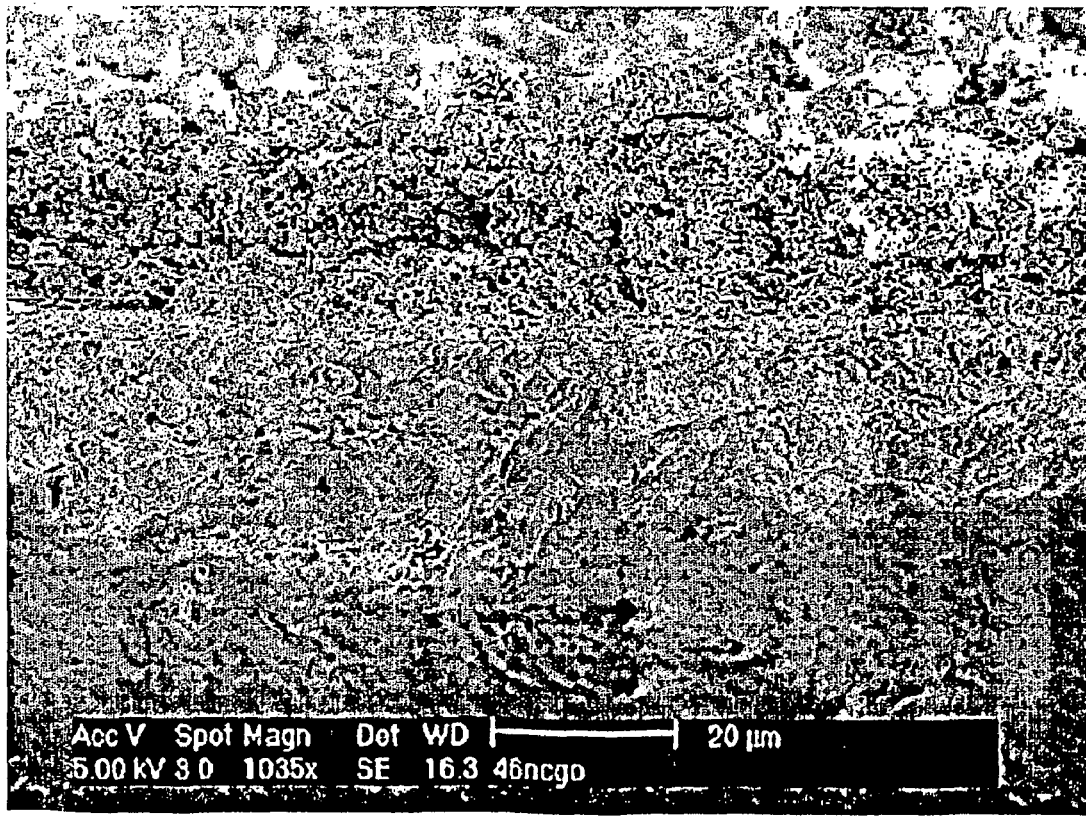
FIG. 9 illustrates a SEM micrograph of a $Ni_{0.58}Cu_{0.42}$-CGO anodic cermet layer of the invention, in cross-section.

Analysis of Morphology and Carbon Deposition Characteristics of the Anodic Cermet The overall process of formation of the $Ni_{0.58}Cu_{0.42}$ alloy/CGO cermet in a cell prepared according to Example 6, and the modifications occurring after its exposure to dry methane, according to Example 8 under electrochemical operation conditions were investigated by SEM (scanning electron microscopy), and TEM (transmission electron microscopy) analyses. SEM analysis (FIG. 9) shows uniform porosity of the anodic layer (upper part in the figure, on the membrane layer) during the preparation steps and after operation in the fuel cell. Further insights on the morphology were obtained by TEM analysis.

Figure 10A:
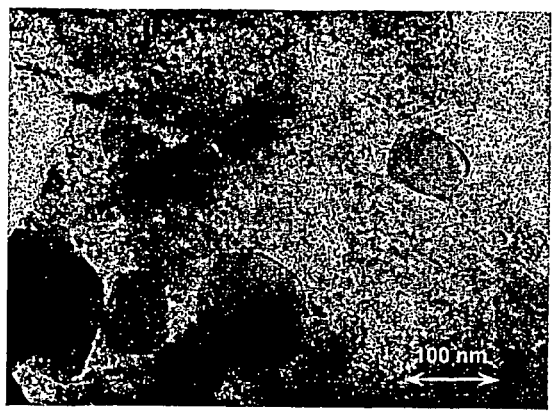
FIGS. 10a and 10b show TEM images of, respectively, amorphous and crystalline $Ni_{0.58}Cu_{0.42}$-CGO cermet according to the invention.

Distinction between $Ni_{0.58}Cu_{0.42}O$ (or $Ni_{0.58}Cu_{0.42}$ alloy) and CGO phases was possible by observing the lattice planes at high magnification which are quite different in spacing between the two phases (FIG. 10a).

Figure 10B:
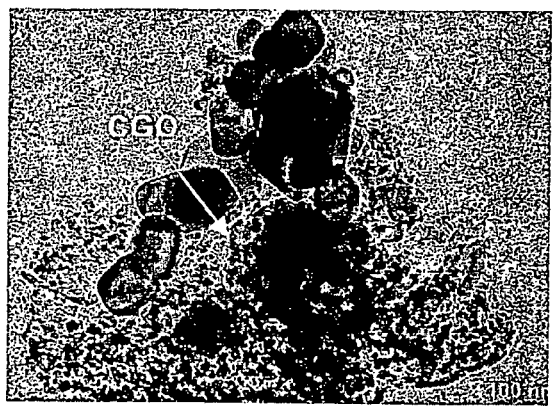

TEM analysis of the amorphous $Ni_{0.58}Cu_{0.42}O$-crystalline CGO cermet precursors clearly indicates a significant difference in terms of particle sizes between the two phases. After thermal treatment in air at 500° C., the $Ni_{0.58}Cu_{0.42}O$ phase became crystalline but there was only a slight increase in the particles size associated to this phase which are surrounding the larger CGO crystals (FIG. 10b). After thermal reduction and subsequent operation under fuel cell conditions, the dimension of $Ni_{0.58}Cu_{0.42}$ and CGO particles became similar (FIG. 11), these particles join together maximizing the interface characteristics. It has been demonstrated that the present invention allows a superior extension of the three-phase boundary zone.

Figure 11:
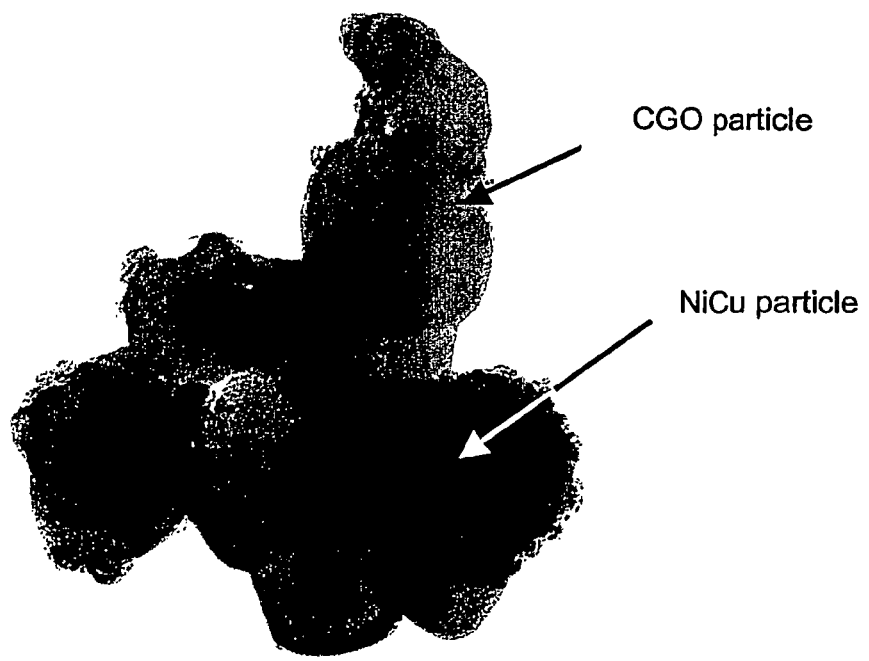
FIG. 11 show a low resolution TEM micrograph of $Ni_{0.58}Cu_{0.42}$-CGO anodic cermet layer, according to the invention, after 25 h at 250 mA $cm^{-2}$ in dry methane

After operation of the anodic cermet at 800° C. under SOFC conditions with a current density of 250 mA cm$^{-2}$ for 20 hrs, no evidence of carbon formation was observed by TEM on the surface of the alloy particles, as from FIG. 11.

Another cell, analogously prepared, was operated at 700° C. for 50 hours. Also in this case no evidence of carbon deposition was detected by TEM.

This result is opposite of that reported in Kim H., Lu C., Worrell W. L., Vohs J. M., Gorte R. J., J. Electrochem. Soc., 149 (3) A247-A250 (2002) indicating a significant carbon deposition in the same time interval for an impregnated NiCu alloy layer under SOFC operation at 800° C.

The cermet anode of the present invention is able to make the solid oxide fuel cell comprising it to operate with a wide selection of fuels. Especially said cermet, thanks to its characteristics of ionic and electronic conductivity, and surface area and catalytic activity, permits the use of dry methane as fuel for electrochemical apparatus, without any sign of carbon deposition.

The invention claimed is:

1. A solid oxide fuel cell comprising:
   a cathode;
   at least an electrolyte membrane selected from yttria-stabilized zirconia, cerium gadolinium oxide and samarium-doped ceria, and
   an anode for oxidizing a fuel, the anode comprising a ceramic material and an alloy comprising nickel and copper,
   wherein said alloy comprises alloy particles having an average particle size not lower than 10 nm and not higher than 20 nm, and
   wherein said ceramic material comprises ceramic material particles directly exposed to the fuel to form a three-phase boundary when the fuel is fed to the anode.

2. The solid oxide fuel cell according to claim 1 wherein said alloy has an average particle size not higher than 16 nm.

3. The solid oxide fuel cell according to claim 1, wherein said alloy has a mean surface area higher than 20 m$^2$/g.

4. The solid oxide fuel cell according to claim 3, wherein said alloy has a mean surface area higher than 30 m$^2$/g.

5. The solid oxide fuel cell according to claim 4, wherein said alloy has a mean surface area higher than 40 m$^2$/g.

6. The solid oxide fuel cell according to claim 1, wherein said alloy has a second metal content of 1% by weight to 99% by weight.

7. The solid oxide fuel cell according to claim 6 wherein said alloy has a second metal content of 30% by weight to 70% by weight.

8. The solid oxide fuel cell according to claim 7, wherein said alloy has a second metal content of 40% by weight to 60% by weight.

9. The solid oxide fuel cell according to claim 1, wherein said alloy has a nickel content of 1% by weight to 99% by weight.

10. The solid oxide fuel cell according to claim 6, wherein said alloy has a nickel content of 30% by weight to 70% by weight.

11. The solid oxide fuel cell according to claim 7, wherein said alloy has a nickel content of 40% by weight to 60% by weight.

12. The solid oxide fuel cell according to claim 1, wherein said ceramic material is selected from yttria-stabilized zirconia, cerium gadolinium oxide, samarium-doped ceria, mixed lanthanum and gallium oxides.

13. The solid oxide fuel cell according to claim 1, wherein said ceramic material has a particle size not higher than 50 nm.

14. The solid oxide fuel cell according to claim 1, wherein said ceramic material has a particle size of 1 nm to 25 nm.

15. The solid oxide fuel cell according to claim 1, wherein said ceramic material is doped with at least one cation selected from calcium, magnesium, strontium, lanthanum, yttrium, ytterbium, neodymium and dysprosium.

16. The solid oxide fuel cell according to claim 12, wherein said ceramic material is cerium gadolinium oxide.

17. The solid oxide fuel cell according to claim 1, wherein said cell performs in substantially dry hydrocarbon.

* * * * *

UNITED STATES PATENT AND TRADEMARK OFFICE
CERTIFICATE OF CORRECTION

| | |
|---|---|
| PATENT NO. | : 7,855,003 B2 |
| APPLICATION NO. | : 10/532302 |
| DATED | : December 21, 2010 |
| INVENTOR(S) | : Arico et al. |

It is certified that error appears in the above-identified patent and that said Letters Patent is hereby corrected as shown below:

Title Page, Item (57), in the Abstract, line 7, "cells shows" should read --cell shows--.

Signed and Sealed this
Thirteenth Day of September, 2011

David J. Kappos
*Director of the United States Patent and Trademark Office*